(12) United States Patent
Jhingan

(10) Patent No.: US 8,583,696 B2
(45) Date of Patent: *Nov. 12, 2013

(54) CONFIGURABLE FLAT FILE DATA MAPPING TO A DATABASE

(75) Inventor: Nitin Jhingan, Endwell, NY (US)

(73) Assignee: SAP AG, Walldorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 13/432,075

(22) Filed: Mar. 28, 2012

(65) Prior Publication Data

US 2012/0185443 A1 Jul. 19, 2012

Related U.S. Application Data

(63) Continuation of application No. 12/212,861, filed on Sep. 18, 2008, which is a continuation of application No. 10/688,574, filed on Oct. 17, 2003, now Pat. No. 7,457,819.

(51) Int. Cl.
*G06F 7/00* (2006.01)
*G06F 17/00* (2006.01)
*G06F 17/30* (2006.01)

(52) U.S. Cl.
USPC .................. 707/798; 707/792; 707/803

(58) Field of Classification Search
None
See application file for complete search history.

(56) References Cited

U.S. PATENT DOCUMENTS

| | | | |
|---|---|---|---|
| 6,505,172 B1 | 1/2003 | Johnson et al. | |
| 6,609,123 B1 * | 8/2003 | Cazemier et al. | 1/1 |
| 6,704,743 B1 | 3/2004 | Martin | |
| 6,820,135 B1 | 11/2004 | Dingman et al. | |
| 6,999,956 B2 | 2/2006 | Mullins | |
| 7,129,958 B2 | 10/2006 | Newman et al. | |
| 7,379,982 B2 | 5/2008 | Tabbara | |
| 7,457,819 B2 * | 11/2008 | Jhingan | 1/1 |
| 7,497,370 B2 * | 3/2009 | Allen et al. | 235/375 |
| 7,634,477 B2 | 12/2009 | Hinshaw | |
| 8,214,407 B2 * | 7/2012 | Jhingan | 707/798 |
| 2002/0111922 A1 | 8/2002 | Young et al. | |
| 2004/0078328 A1 | 4/2004 | Talbert et al. | |
| 2004/0181753 A1 | 9/2004 | Michaelides | |

* cited by examiner

*Primary Examiner* — Susan Chen
(74) *Attorney, Agent, or Firm* — Sterne, Kessler, Goldstein and Fox P.L.L.C.

(57) ABSTRACT

Disclosed are a method and framework for mapping data from a data source to a data destination. The method comprises the step of providing a plurality of components for performing defined functions to map the data from the source to the destination. These plurality of components perform the steps of (i) reading data from the source, (ii) processing the read data according to a set of rules, and (iii) loading the processed data into the destination. Preferably the plurality of components perform the further steps of (iv) verifying the integrity of the read data, and (v) logging results into a file. Each of the components operates independently of the other of the components.

18 Claims, 3 Drawing Sheets

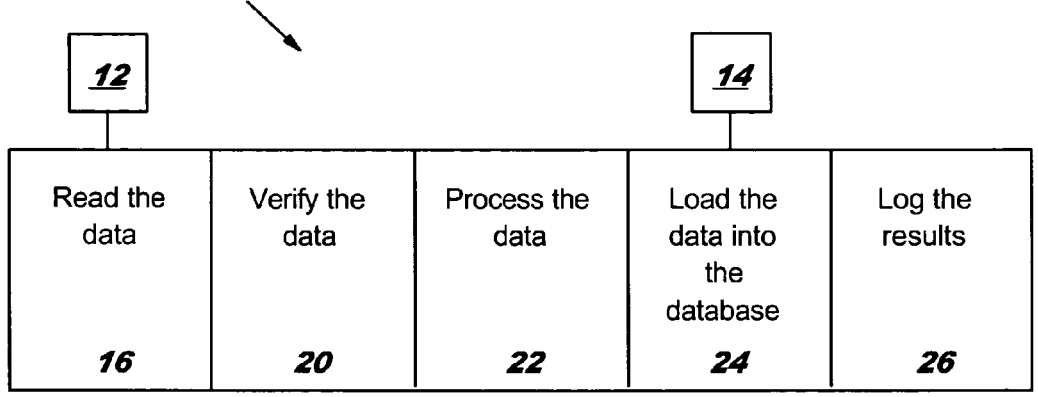
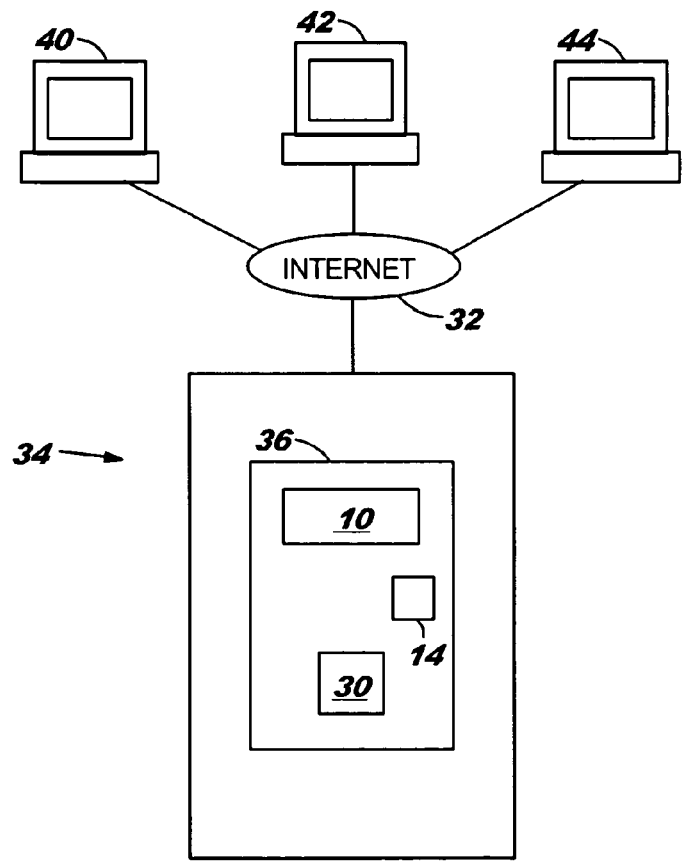

FIG. 3

HEADER <name> <date>
CURR1USD
CURR2USD INR 46
TRAILER 000002 <timestamp>

FIG. 4

```
/**
 * Insert the type's description here.
 * Creation date: (01/03/01 10:40:38 PM)
 * @author: Nitin Jhingan
 */
public interface Formatter {
/**
 * Insert the method's description here.
 * Creation date: (01/03/01 10:41:06 PM)
 * @return java.lang.String
 * @param param java.lang.String
 */
String format(String param);
}
```

FIG. 5

```
import java.util.*;
/**
 * Insert the type's description here.
 * Creation date: (11/02/00 10:54:38 PM)
 * @author: Nitin Jhingan
 */
public interface Implementer {
/**
 * Insert the method's description here.
 * Creation date: (11/02/00 10:55:38 PM)
 * @return int
 * @param param java.util.Hashtable
 */
String int process(Hashtable param);
}
```

FIG. 6

```
import java.util.*;
/**
 * Insert the type's description here.
 * Creation date: (2/27/2002 3:30:31 PM)
 * @author: Nitin Jhingan
 */
public interface Logger {
/**
 * Insert the method's description here.
 * Creation date: (3/4/2002 2:58:19 PM)
 * @param identifier java.lang.String
 * @param value int
 */
void addProcessingCount(String identifier, long value);
/**
 * Insert the method's description here.
 * Creation date: (3/4/2002 2:43:12 PM)
 * @param identifier java.lang.String
 * @param value java.lang.String
 */
void addText(String identifier, String strRecord, Hashtable value);
/**
 * Insert the method's description here.
 * Creation date: (3/4/2002 1:23:14 PM)
 */
void cleanUp();
/**
 * Insert the method's description here.
 * Creation date: (3/4/2002 1:22:43 PM)
 * @param param java.util.Hashtable
 */
void initialize(java.util.Hashtable param);
/**
 * Insert the method's description here.
 * Creation date: (3/4/2002 1:23:28 PM)
 /*
void sendMail();
}
```

CONFIGURABLE FLAT FILE DATA MAPPING TO A DATABASE

CROSS REFERENCE TO RELATED APPLICATION

The present application is a continuation application of U.S. patent application Ser. No. 12/212,861, filed Sep. 18, 2008, now U.S. Pat. No. 8,214,407, which is a continuation of U.S. patent application Ser. No. 10/688,574, filed Oct. 17, 2003, now U.S. Pat. No. 7,457,819.

BACKGROUND OF THE INVENTION

1. Field of the Invention

This invention generally relates to data mapping, and more specifically, the invention relates to mapping data from an input file to a database.

2. Background Art

Computer applications are being used more and more. Today, particularly with the widespread availability of the Internet, businesses are able to make an ever increasing number of applications available worldwide twenty-four hours a day, seven days a week for use by customers, employees and suppliers. This presents important opportunities and challenges for businesses.

One challenge is to design the applications so that they can be used by different users who may access or input data to the applications using different data formats or files. Another challenge is to design the applications so that, in case users change the data formats used to input data to the applications, or it otherwise becomes advantageous to change the way data is input to the applications, the applications can be readily modified to accommodate new or different data formats and files.

SUMMARY OF THE INVENTION

An object of this invention is to improve methods and systems for mapping data from a source to a database.

Another object of the invention is to provide an extensible framework having a group of components, which can be readily modified or replaced, for handling various functions as data is mapped from a source to a database.

A further object of the present invention is to provide a framework, comprised of a group of independently adjustable components, to process data from one source, validate the data, apply business rules on the data, load the data into a database, log the results of this whole procedure, and send mailings to configured parties.

These and other objectives are attained with a method and framework for mapping data from a data source to a data destination. The method comprises the step of providing a plurality of components for performing defined functions to map the data from the source to the destination. These plurality of components perform the steps of (i) reading data from the source, (ii) processing the read data according to a set of rules, and (iii) loading the processed data into the destination. Preferably the plurality of components perform the further steps of (iv) verifying the integrity of the read data, and (v) logging results into a file. Each of the components operates independently of the other of the components.

The preferred embodiment of the invention, described in detail below, provides a framework written in the java programming language to read a file and to verify the file data by, for example, checking for counts and/or data consistencies. The framework then processes the data, which may involve applying various business logic classes as applicable, and then loads the data into a database. The framework also logs the results into a file, which can then be emailed.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 1 schematically illustrates a processing framework in accordance with this invention.

FIG. 2 shows a computer network system with which the present invention may be used.

FIG. 3 is an example of a file that may be read by the framework of FIG. 1.

FIG. 4 shows an example of a formatter interface code that may be used by the framework.

FIG. 5 provides an example of an implementer interface code that may be implemented by the framework.

FIG. 6 shows the code for a logger feature that may be used by the framework.

DETAILED DESCRIPTION OF THE PREFERRED EMBODIMENTS

With reference to FIG. 1, the preferred embodiment of the invention provides a framework, generally referenced at 10, for mapping data from a source, represented at 12, to a database, represented at 14; and this framework comprises a plurality of components 16, 20, 22, 24 and 26 for performing various functions. Component 16 is provided to read a file, and component 20 is used to verify the file data by, for example, checking for counts and/or data consistencies. Component 22 is used to process the data, which may involve applying various business logic classes as applicable, component 24 is utilized for loading the data into a database 14, and component 26 is provided to log the results into a file, which can then be emailed.

Component 16 may utilize any suitable procedure and is provided with suitable means to read data from a file. For example component 16 may be designed to read flat, or xml, files. Also, any suitable procedure may be employed by component 20 to verify the integrity of the read data. Numerous such procedures are known in the art and can be used in the practice of this invention.

Component 22 may apply a wide range of business rules to the data read by framework. Preferably, these rules can be created, modified or deleted by an authorized administrator. In addition, any appropriate procedure may be used by component 24 for loading the data into a database. Many specific procedures are known by those of ordinary skill in the art and can be used in component 24.

It should be noted that while the specific framework 10 represented in FIG. 1 only reads files, the framework can be extended to other sources of data like databases, mq series queues, etc. Also, while this specific embodiment of framework 10 only loads data into a database, the framework can be extended to other sources as well.

Preferably, each of the components 16, 20, 22, 24 and 26 operates independently of the other components of the framework 10. In this way, each component can be modified or replaced without affecting the operation of the other components. Also, preferably the individual programs of the components 16, 20, 22, 24 and 26 can be updated or modified by authorized administrators during the use of framework 10.

Framework 10 of this invention can be used in many specific situations. For example, the framework may be used in conjunction with, and be specifically designed to assist, some other application, which uses the data from database 14. In addition, framework 10 may be used on or with a computer network, such as a LAN, a WAN or the Internet.

FIG. 2 shows, for example, framework 10 used in conjunction with another application 30 available via the Internet 32 at a Web site 34. More particularly, FIG. 2 shows a server 36 and a plurality of clients 40, 42, 44. Server 36 and clients 40, 42, 44 are connected to the Internet 32, and the server is provided with application 30, which can be accessed by clients 40, 42, 44 via the Internet. Server 36 is also provided with framework 10, which runs on the server to map input data from the clients to database 14, from where the data can be accessed by application 30.

FIGS. 3-6 show, as more particular examples, specific file or code that can be used with or on framework 10. In particular, FIG. 3 shows an example of a file rcvd for currencies that may be read by framework 10. As mentioned above, it should be noted that while the specific framework 10 represented in FIGS. 1 and 2 only reads files, the framework can be extended to other sources of data like databases, mq series queues, etc.

More specifically, framework 10 maps fixed length fields in the input file to a java object type pofield. This framework reads the xml file. For a particular field, the framework determines the start position, the length, what database column the field maps to, which database tables the field maps to, whether the field can be updated or not, and what kind of formatter to be applied on this field. The framework calls the java class as defined within the <formatter> </formatter> tags. This java class implements the formatter interface, defined as: package com.ibm.kestrel bridges. FIG. 4 shows an example of a formatter interface code.

Another file may be used to define an event handler. The event handler preferably implements the Implementer interface:—package com.ibm.kestral bridges. FIG. 5 shows an example of an Implementer interface code.

The interface of FIG. 4 defines one method: String format (String param). This method may be overridden by the implementations of this formatter class. This is useful, for example, for formatting data fields. For example, a source system may send a date in the format of yyyymmdd, but the database table may accept only a timestamp. By utilizing a formatter, the present invention eliminates the need for writing code for formatting a date within the business logic classes.

The Implementer Interface of FIG. 5 refers to a Hashtable. This Hashtable object contains a map of pofield objects and other classes, like the DBActions class that is used to manage database activity.

The framework 10 also preferably manages transactions. A transaction is started when the first record is read, and the transaction is committed or rolled back when the record, as defined in a record parameter, is encountered. This helps to insulate programs with which framework 10 is used from managing a transaction.

Preferably, framework 10 includes a Logger feature that can be used by implementing the Logger interface:—package com.ibm.kestrel bridges. FIG. 6 shows, as an example, the code for a Logger feature.

Using this logger feature, an application can add various notifications, and then finally send an e-mail to a configured list of email ids. The Logger feature of FIG. 6 supports sending mail using TO, CC and the BCC features of the mail.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method for mapping data from a plurality of clients to a database, comprising the steps:
   providing a plurality of mapping components for performing defined functions to map the data from the clients to the database;
   using a computer server, implementing said plurality of mapping components, to perform the steps of:
   i) reading data from the clients, ii) processing the read data according to a set of rules, and iii) loading the processed data into the database;
   wherein each of the components operates independently of the other of the components; and
   said step of using the computer server includes the step of using the computer server, implementing said plurality of mapping components, to perform the further steps of:
   mapping fixed length fields in the data to pofields in the database; and
   determining database tables that the fields in the data map to in the database, including determining start positions that the fields map to in the database by referring to Hash Table Objects that contain a map of pofield objects in a database action class that is used to manage database activity.

2. A method according to claim 1, wherein the computer server, implementing the plurality of mapping components, performs, the further steps of
   iv) verifying the integrity of the read data, and
   v) logging results into a file.

3. A method according to claim 2, wherein a respective one of the mapping components implements each of the steps (i)-(v).

4. A method according to claim 1, wherein the database is on the computer server.

5. A method according to claim 1, wherein the computer server, implementing the plurality of mapping components, performs, the further step of sending the results, by electronic mail, to a configured list of email addresses.

6. A method according to claim 1, wherein the step of processing the read data includes the step of formatting the read data for placement in the database.

7. A computer system for mapping data from a plurality of clients to a database, comprising:
   a computer server;
   a plurality of components running on the computer server for performing defined functions to map the data from the plurality of clients to the database, said functions including (i) reading data from the clients, (ii) processing the read data according to a set of rules, and (iii) loading the processed data into the database;
   wherein each of the components operates independently of the other of the components; and
   said plurality of separate components running on the computer server perform the further function of:
   mapping fixed length fields in the data to pofields in the database; and
   determining database tables that the fields in the data map to in the database,
   including determining start positions that the fields map to in the database by referring to Hash Table Objects that contain a map of pofield objects in a database action class that is used to manage database activity.

8. The computer system according to claim 7, wherein the plurality of components running on the computer server perform the further functions of (iv) verifying the integrity of the read data, and (v) logging results into a file.

9. The computer system according to claim 8, wherein a respective one of the components performs each of the functions (i)-(v).

10. The computer system according to claim 7, wherein the database is on the computer server.

11. The computer system according to claim 7, wherein the plurality of components running on the computer server perform the further function of sending the results, by electronic mail, to a configured list of email addresses.

12. The computer system according to claim 7, wherein the function of processing the read data includes the function of formatting the read data for placement in the database.

13. A program storage device readable by a computer system, tangibly embodying a program of instructions executable by the computer system to perform method steps for mapping data from a plurality of clients to a database, said method steps comprising:
  establishing a plurality of components for performing defined functions when executed on the computer system to map the data from the plurality of clients to the database, said plurality of components when executed on the computer system performing the steps of:
  i) reading data from the clients, ii) processing the read data according to a set of rules, and
  iii) loading the processed data into the database,
  wherein each of the components operates independently of the other of the components; and
  the plurality of separate components when executed on the computer system perform the further steps of:
  mapping fixed length fields in the data to pofields in the database; and
  determining database tables that the fields in the data map to in the database, including determining start positions that the fields map to in the database by referring to Hash Table Objects that contain a map of pofield objects in a database action class that is used to manage database activity.

14. A program storage device according to claim 13, wherein the plurality of components when executed on the computer system perform the further steps of
  iv) verifying the integrity of the read data, and
  v) logging results into a file.

15. A program storage device according to claim 14, wherein a respective one of the components performs each of the steps (i)-(v).

16. A program storage device according to claim 13, wherein database is on the computer server.

17. A program storage device according to claim 13, wherein the plurality of components when executed on the computer system perform the further step of sending the results, by electronic mail, to a configured list of email addresses.

18. A program storage device according to claim 13, wherein the step of processing the read data includes the step of formatting the read data for placement in the data database.

* * * * *